United States Patent
Ishida et al.

(10) Patent No.: US 9,905,859 B2
(45) Date of Patent: Feb. 27, 2018

(54) CATALYST FOR SOLID POLYMER FUEL CELL AND METHOD FOR MANUFACTURING THE SAME

(71) Applicant: TANAKA KIKINZOKU KOGYO K.K., Tokyo (JP)

(72) Inventors: Minoru Ishida, Hiratsuka (JP); Koichi Matsutani, Haratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 24 days.

(21) Appl. No.: 14/764,247

(22) PCT Filed: Jan. 31, 2014

(86) PCT No.: PCT/JP2014/052209
§ 371 (c)(1),
(2) Date: Jul. 29, 2015

(87) PCT Pub. No.: WO2014/119707
PCT Pub. Date: Aug. 7, 2014

(65) Prior Publication Data
US 2015/0372314 A1  Dec. 24, 2015

(30) Foreign Application Priority Data
Feb. 4, 2013 (JP) ................. 2013-019304

(51) Int. Cl.
| H01M 4/92 | (2006.01) |
| H01M 4/90 | (2006.01) |
| H01M 8/1018 | (2016.01) |
| B01J 35/00 | (2006.01) |
| H01M 4/86 | (2006.01) |

(52) U.S. Cl.
CPC ......... *H01M 4/921* (2013.01); *H01M 4/9083* (2013.01); *H01M 4/92* (2013.01); *H01M 4/926* (2013.01); *H01M 8/1018* (2013.01); B01J 35/0033 (2013.01); H01M 2004/8689 (2013.01); H01M 2008/1095 (2013.01)

(58) Field of Classification Search
CPC ................. H01M 4/92; H01M 4/921
See application file for complete search history.

(56) References Cited

U.S. PATENT DOCUMENTS

2002/0015878 A1* 2/2002 Tsumura ............... H01M 4/885
429/484
2007/0082256 A1  4/2007 Debe

FOREIGN PATENT DOCUMENTS

| JP | 2001-126738 A | 5/2001 |
| JP | 2001-511217 A | 8/2001 |
| JP | 2002-100374 A | 4/2002 |
| JP | 2006-147200 A | 6/2006 |
| JP | 2006-252966 A | 9/2006 |
| JP | 2010-027364 A | 2/2010 |
| JP | 2010-253408 A | 11/2010 |
| JP | 2011-150867 A | 8/2011 |

OTHER PUBLICATIONS

PCT, International Search Report PCT/JP2014/052209, dated Apr. 8, 2014.
EP, Extended European search report, including the supplementary European search report and the European search opinion, dated Jul. 18, 2016, concerning application 1476144.6-1360/2953195 PCT/JP2014052209.
A. Bonakdarpour, et al. Oxygen reduction activity of Pt and Pt—Mn—Co electrocatalysts sputtered on nano-structured thin film support. Electrochimica Acta, 2007, vol. 53(2):688-694.

* cited by examiner

*Primary Examiner* — Ladan Mohaddes
(74) *Attorney, Agent, or Firm* — Orrick, Herrington & Sutcliffe LLP; Joseph A. Calvaruso

(57) ABSTRACT

The invention is a catalyst for solid polymer fuel cell having catalyst particles composed of platinum, cobalt and magnesium supported on a carbon powder carrier, in which a composition ratio (molar ratio) among platinum, cobalt and magnesium in the catalyst particles is Pt:Co:Mg=1:0.4 to 0.5:0.00070 to 0.00095. This catalyst is manufactured by supporting cobalt and magnesium on a platinum catalyst and then conducting a heat treatment and a treatment to be brought into contact with an oxidizing solution, the feature of the catalyst manufactured in this manner includes a peak position of a main peak appearing between $2\theta=40°$ and $42°$ in X-ray diffraction analysis, and the peak position is shifted to from $41.0°$ to $41.5°$.

2 Claims, 2 Drawing Sheets

CATALYST FOR SOLID POLYMER FUEL CELL AND METHOD FOR MANUFACTURING THE SAME

TECHNICAL FIELD

The invention relates to a catalyst for solid polymer fuel cell. In particular, it relates to a useful catalyst for use in a cathode (air electrode) of a solid polymer fuel cell.

BACKGROUND ART

A fuel cell, particularly a solid polymer fuel cell is greatly expected as a next-generation power generating system and has advantages that the operating temperature is lower and the fuel cell is compact as compared to fuel cells of other types, and it is expected as a promising power source for home use and automobiles for these advantages. A solid polymer fuel cell has a layered structure consisting of a hydrogen electrode, an air electrode and a solid polymer electrolyte membrane sandwiched between these electrodes. Incidentally, a hydrogen-containing fuel is supplied to a hydrogen electrode and oxygen or air is supplied to an air electrode, respectively, and electric power is drawn out by oxidation and reduction reactions that occur in each electrode. Moreover, a mixture of a catalyst for promoting the electrochemical reaction and the solid electrolyte is generally applied to both electrodes.

As the catalyst constituting the electrodes described above, a precious metal, in particular a platinum catalyst supporting platinum is widely used as a catalyst metal hitherto. This is because platinum as a catalyst metal exhibits high activity upon promoting the electrode reaction in both the fuel electrode and the hydrogen electrode.

Meanwhile, in recent years, the investigation cases on an alloy catalyst to apply an alloy of platinum and another metal as a catalyst metal have increased in order to secure the catalytic activity while decreasing the amount of platinum used for the cost reduction of a catalyst. Particularly, a Pt—Co catalyst adopting an alloy of platinum and cobalt as catalyst particles is known as a catalyst that can exert higher activity than that of the platinum catalyst even though the amount of platinum used is decreased (Patent Document 1). Moreover, a ternary alloy catalyst (Pt—Co-M alloy) in which a third metal element (M) is alloyed in order to further improve the Pt—Co catalyst has also been reported (Patent Document 2).

RELATED ART DOCUMENT

Patent Document

Patent Document 1: JP 2010-27364 A
Patent Document 2: JP 2011-150867 A

SUMMARY OF THE INVENTION

Problems to be Solved by the Invention

The catalyst of a solid polymer fuel cell is required to have various properties, and particularly the initial activity is preferentially required. In this regard, a platinum alloy catalyst such as a conventional Pt—Co catalyst is useful as an improved product of a platinum catalyst, but it can be said that a further improvement in activity is necessary while taking this as a standard. In view of such a circumstance, the invention provides an alloy catalyst for solid polymer fuel cell which is obtained by alloying platinum and another metal and exhibits more improved initial activity and a method for manufacturing the alloy catalyst.

Means for Solving the Problems

The present inventors have manufactured catalysts by adopting a conventional Pt—Co catalyst as a basis and adding various kinds of metals to this by way of experiment in order to achieve the above object. As a result, it has been found out that an improvement in activity is observed in the catalyst obtained by adding a small amount of magnesium to the Pt—Co catalyst.

That is, the invention is a catalyst for solid polymer fuel cell which is formed by supporting catalyst particles including platinum, cobalt and magnesium on a carbon powder carrier, in which a composition ratio (molar ratio) among platinum, cobalt and magnesium in the catalyst particles is Pt:Co:Mg=1:0.4 to 0.5:0.0007 to 0.00095.

In the invention, the reason for that the activity is improved by adding magnesium to the Pt—Co catalyst is not clear. This is because a qualitatively significant difference by the presence or absence of magnesium addition is not observed according to the investigation by the present inventors. Typically, in the case of adding a third metal (referred to as M) to the Pt—Co catalyst, the formation of a ternary alloy (Pt—Co-M) or an alloy of the third metal (Pt-M alloy, Co-M alloy) in the catalyst particles is predicted. In addition, the formation of such an alloy indicates a change in the bonding state of Pt that is the main constituent metal of the catalyst or the presence of the alloy phase. In contrast, there is no difference in the bonding state of Pt or the constituent alloy phases between the Pt—Co—Mg based catalyst according to the invention and the Pt—Co based catalyst when comparing to each other. In other words, in the catalyst according to the invention, Mg is present in the catalyst particles without being alloyed with other metals.

On the other hand, it is also not so imaginable that magnesium singly contributes to the catalytic activity. If magnesium itself exhibits catalytic activity, the activity should be improved as the additive amount of magnesium increases, but such a tendency has not been observed in the investigation by the present inventors. In addition, in the invention, the additive amount of magnesium is required to be suppressed in a significantly small amount as described above.

From the above result of investigation, the present inventors have discussed a factor other than the formation of a new active species as the factor of an improvement in activity observed when magnesium is added to the Pt—Co catalyst. As a result, the present inventors have considered that the optimization of the existing state of the Pt—Co alloy ($CoPt_3$) that is the active species of the Pt—Co catalyst as the factor of this.

The Pt—Co alloy ($CoPt_3$) is conventionally known to be the main active species of the Pt—Co catalyst. This Pt—Co alloy is formed by having platinum and cobalt supported on a carrier and alloying them in, the manufacturing process of the Pt—Co catalyst, but there is a limitation on the amount of cobalt that is possibly alloyed with platinum at this time. The upper limit of the amount of cobalt that is possibly alloyed does not change even though the amount of cobalt supported is simply increased.

The present inventors have discussed as that the addition of a small amount of magnesium exhibits an action to increase the limit of the amount of cobalt that is possibly alloyed as described above. This is also understood, for example, by comparing the compositional proportion (1:0.11 to 0.19) between platinum and cobalt in the ternary alloy catalyst (Pt—Co-M alloy) described in Patent Document 2 above to the compositional proportion (1:0.4 to 0.5) between platinum and cobalt in the catalyst of the present application. In addition, it is considered that the abundance and existing state of the Pt—Co alloy that is the active species become suitable, which lead to an improvement in activity as the amount of cobalt alloyed increases.

As described above, the catalyst according to the invention is a catalyst of which the catalyst particles are composed of platinum, cobalt and magnesium and in which the composition ratios of cobalt and magnesium which are the elements to be added to platinum are limited within a certain range. Hereinafter, the feature of the invention will be described in more detail.

The reason to set the composition ratios of cobalt and magnesium to be Pt:Co:Mg=1:0.4 to 0.5:0.0007 to 0.00095 is in order to allow the catalyst to exert the initial activity that is equal to or higher than the conventional Pt—Co catalyst as described above. Magnesium is added for improving this activity, but the excessive addition of magnesium rather decreases the activity. The activity is about equivalent to or lower than that of the conventional Pt—Co catalyst when the composition ratios of cobalt and magnesium are out of the above range.

In addition, cobalt is a main constituent element of the Pt—Co alloy that is the active species, and thus it is more preferable as the content of cobalt is higher. It cannot be said that the ratio of cobalt is greater than in the conventional Pt—Co catalyst when the molar ratio of cobalt to platinum is less than 0.4, and an improvement in activity is not acknowledged. In addition, it is difficult to support and alloy cobalt exceeding 0.5 no matter how great action of magnesium is expected. Meanwhile, a more preferred range of the composition ratios of cobalt and magnesium is Pt:Co:Mg=1: 0.42 to 0.48:0.00075 to 0.00095, and particularly suitable initial activity is exhibited in this range.

Incidentally, in the catalyst according to the invention, the fact that a change in the bonding state of Pt or the presence of an alloy phase other than the Pt—Co alloy is not detected when compared to the conventional Pt—Co catalyst is as described above. However, in the investigation by the present inventors, it has been confirmed that a unique difference in the peak position is exhibited in the X-ray diffraction of the catalyst that exhibits more preferred activity in the invention. This suitable catalyst is one that is manufactured by the method for manufacturing a catalyst to be described later and a catalyst that is manufactured by having platinum, cobalt and magnesium supported on a carrier, alloying them, and then eluting a part of magnesium. In the X-ray diffraction analysis of this catalyst, the position of the main peak appearing between 2θ=40° and 42° is slightly shifted to a higher angle side when compared to the conventional Pt—Co catalyst. This main peak is a synthetic peak of Pt and $CoPt_3$ and typically appears in the vicinity of 40° in the conventional Pt—Co catalyst. In contrast, the position of this main peak is shifted to be located at 41.0 to 41.5° although the extent of shift is slight (less than 1°) in the catalyst of the invention. The factor of this peak shift is not clear, but it is presumed to be due to a slight change in the lattice constant by the presence of magnesium or a change in the morphological structure of the catalyst particles. The change in the morphological structure of the catalyst particles is discussed as that fine pores are formed at the sites where there has been magnesium when magnesium is eluted after alloying and thus the catalyst particles have a skeleton structure with a great number of pores. In addition, it is considered that there is also a possibility that such a morphological change contributes to a slight change in the X-ray diffraction pattern. Although it cannot be concluded which factor between the two described above causes the peak shift, a catalyst having such a peak shift is preferable in terms of exhibiting high activity.

The catalyst particles in the invention are preferably those which have an average particle size of from 2 to 20 nm. This is because long-term activity maintenance properties cannot be clearly obtained when the average particle size is less than 2 nm and the initial activity of the catalyst cannot be sufficiently obtained when the average particle size is more than 20 nm. In addition, as the carbon powder of a carrier, it is preferable to apply a carbon powder having a specific surface area of from 250 to 1200 $m^2/g$. This is because it is possible to increase the area in which the catalyst adheres by setting the specific surface area to 250 $m^2/g$ or more and thus it is possible to increase the effective surface area by dispersing the catalyst particles in a high state. On the other hand, the existing proportion of the ultrafine pores (about less than 20 Å) into which the ion exchange resin hardly penetrates when forming the electrode increases and thus the utilization efficiency of the catalyst particles decreases when the specific surface area is more than 1200 $m^2/g$.

Meanwhile, with regard to the catalyst according to the invention, it is preferable that the supporting density of the catalyst particles be set to from 30 to 70% in consideration of the performance as an electrode of the solid polymer fuel cell. The supporting density herein means the ratio of the mass (total mass of platinum, cobalt and magnesium supported) of the catalyst particles to be supported on a carrier to the entire mass of the catalyst.

Next, the method for manufacturing a catalyst for solid polymer fuel cell according to the invention will be described. In the method for manufacturing a catalyst according to the invention, the basic process conforms to the method for manufacturing a general platinum alloy catalyst, and platinum, cobalt and magnesium constituting the catalyst particles are supported on a carrier, appropriately dried, and then subjected to a heat treatment to alloy platinum and cobalt which are supported.

However, in the invention, it is essential to first prepare a catalyst supporting only platinum and to support cobalt and magnesium on this catalyst in the step of supporting a catalyst metal. Upon supporting catalyst metals, it is general and also efficient to simultaneously support the constituent metals on a carrier, the catalyst manufactured by such simultaneously supporting does not exhibit preferred catalytic activity in some cases.

For the manufacture of the platinum catalyst, a platinum catalyst obtained by a conventional manufacturing method of a platinum catalyst may be applied. A commercially available platinum catalyst may also be utilized. Typically, a platinum catalyst is manufactured by bringing a platinum salt solution into contact (impregnation, dropping) with a carrier and then forming platinum particles by a reduction treatment.

The supporting of cobalt and magnesium on the platinum catalyst itself is also conducted by a general method. Metal salt solutions of cobalt and magnesium are brought into contact with the platinum catalyst and cobalt and magnesium in a metal state are precipitated in the vicinity of the platinum particles by a reduction treatment. It is possible to use cobalt chloride hexahydrate, cobalt nitrate, cobalt acetate tetrahydrate and the like as the metal salt solution of cobalt, and it is possible to use magnesium chloride hexahydrate, magnesium nitrate hexahydrate, magnesium acetate tetrahydrate and the like as the metal salt solution of magnesium. The order of bringing the metal salt solutions into contact with the platinum catalyst at this time is not particularly limited, and either metal salt solution may be previously brought into contact with the platinum catalyst or a mixture of the metal salt solutions of cobalt and magnesium may be brought into contact with the platinum catalyst.

Meanwhile, with regard to the amount of cobalt and magnesium supported, the concentration and amount of the metal salt solutions is set so as to have the ratio that is set within the range of the composition ratios of cobalt and magnesium described above based on the amount of the platinum catalyst supported. At this time, the amounts of cobalt and magnesium supported are preferably set to about from 1.4 to 1.6 times for cobalt and about from 400 to 1050 times for magnesium with respect to the composition ratios set, respectively since the catalyst after alloying is treated with an oxidizing solution in the method according to the invention as to be described later.

After cobalt and magnesium are supported on the platinum catalyst, drying is conducted if necessary and the respective metals are then alloyed by the heat treatment. Here, the heat treatment temperature for the alloying is set to from 700 to 1100° C. The formation of the Co—Pt alloy phase is insufficient and thus a catalyst exhibiting poor activity is obtained when the heat treatment is conducted at lower than 700° C. In addition, the alloying more easily proceeds and the formation of the Co—Pt alloy phase is also promoted as the heat treatment temperature is higher, but coarsening of the catalyst particles is concerned and there are difficulties for the facility when the heat treatment is conducted at higher than 1100° C. and thus the upper limit is set to 1100° C. This heat treatment is preferably conducted in a non-oxidizing atmosphere and particularly preferably conducted in a reducing atmosphere (hydrogen gas atmosphere and the like).

Thereafter, the catalyst that has undergone the heat treatment step described above is brought into contact with an oxidizing solution at least one time. By virtue of this, magnesium on the surface of the catalyst particles is eluted and the catalyst particles having the preferred X-ray diffraction pattern described above are formed. As this oxidizing solution, a solution of sulfuric acid, nitric acid, phosphorous acid, permagnesium acid potassium, hydrogen peroxide, hydrochloric acid, chloric acid, hypochlorous acid, chromic acid or the like is preferable. The concentration of these oxidizing solutions is preferably set to from 0.1 to 1 mol/L, and it is preferable to immerse the catalyst in the solution.

As the conditions of the treatment with an oxidizing solution, the contact time is set to preferably from 1 to 30 hours and more preferably 2 hours or longer. In addition, the treatment temperature is preferably from 40 to 110° C. and more preferably 60° C. or higher. Meanwhile, the treatment with an oxidizing solution may be conducted not only one time but also plural times by bringing the catalyst into contact with an oxidizing solution. In addition, the kind of solution may be changed for each treatment in the case of conducting the acid treatment plural times.

Advantageous Effects of the Invention

As described above, the catalyst for solid polymer fuel cell according to the invention exhibits excellent initial activity by limiting the composition ratios of cobalt and magnesium while employing the form of a ternary catalyst to add magnesium to the Pt—Co catalyst.

DESCRIPTION OF EMBODIMENTS

Figure 1:
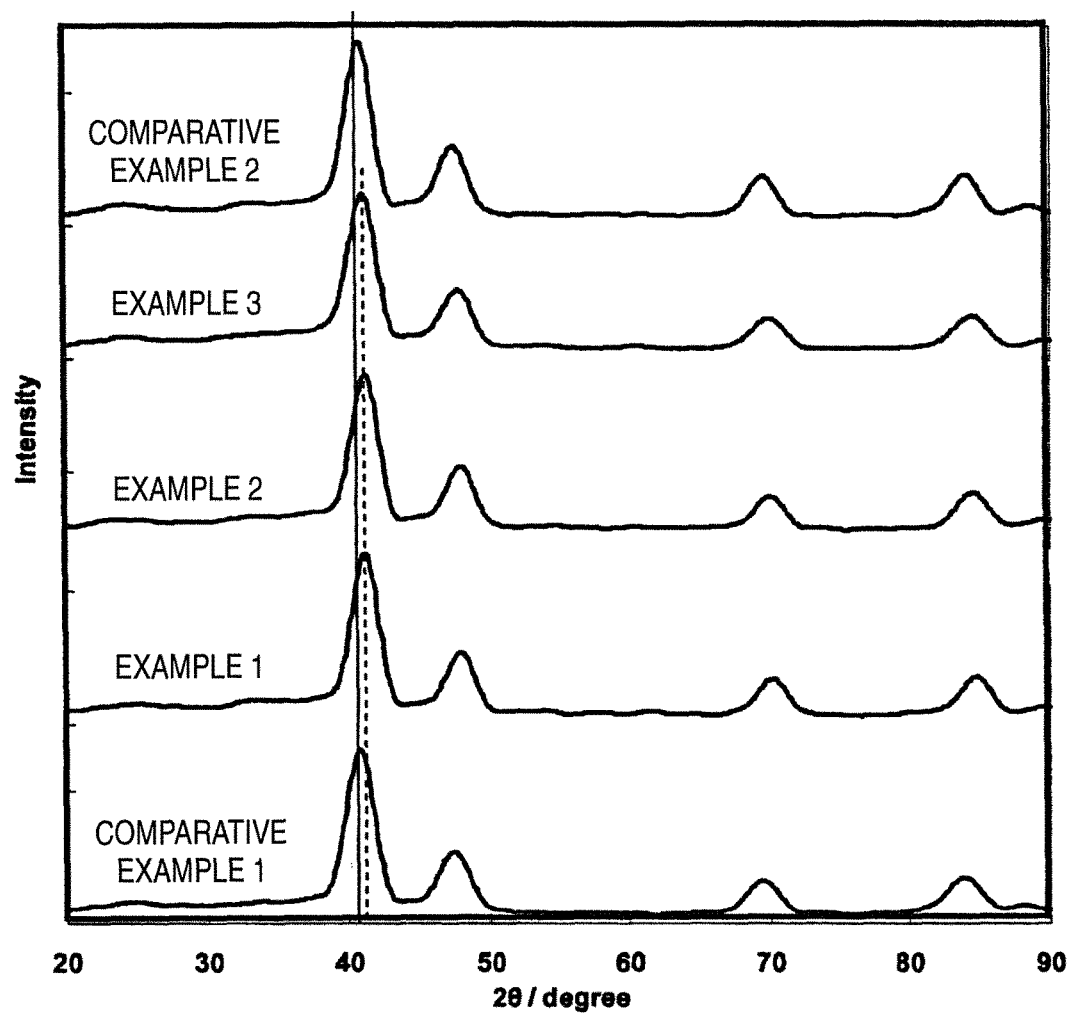
FIG. 1 illustrates the X-ray diffraction patterns of the respective catalysts according to Examples 1 to 3 and Comparative Examples 1 and 2.

Hereinafter, preferred embodiments of the invention will be described. In the present embodiment, a plurality of ternary catalysts of Pt—Co—Mg which have different composition ratios of catalyst metals were manufactured, and the catalytic activity of the ternary catalysts was evaluated as well as the nature of the ternary catalysts was examined. The basic process for manufacturing the catalyst is as follows.

[Supporting of Catalyst Metal]

A platinum catalyst was manufactured and cobalt and magnesium were supported on this. As the platinum catalyst, 5 g (2.325 g (11.92 mmol) in terms of platinum) of a platinum catalyst having a carbon fine powder (specific surface area of about 900 $m^2/g$) as the carrier and a platinum supporting rate of 46.5% by mass was prepared. A mixed solution of a cobalt salt and a magnesium salt was then prepared by dissolving 1.89 g of cobalt chloride ($CoCl_2.6H_2O$) and 1.61 g of magnesium chloride ($MgCl_2.6H_2O$) in 100 mL of ion exchanged water, and the above platinum catalyst was impregnated with this mixed solution. After that, sodium borohydride was added to the platinum catalyst as a reducing agent to support cobalt and magnesium.

The catalyst on which the catalyst metals were supported in the above was subjected to the heat treatment for alloying. In the present embodiment, the heat treatment was conducted at the heat treatment temperature of 900° C. for 30 minutes in 100% hydrogen gas. A ternary catalyst of Pt—Co—Mg was manufactured by this heat treatment for alloying.

Next, the catalyst after the heat treatment was treated with an oxidizing solution. The catalyst was treated in a 0.2 mol/L aqueous solution of sulfuric acid at 80° C. for 2 hours, then filtered, washed and dried. After that, the catalyst was treated in a 1.0 mol/L aqueous solution of nitric acid (dissolved oxygen of 0.01 $cm^3/cm^3$ (in terms of STP)) at 70° C. for 2 hours, then filtered, washed and dried.

Meanwhile, in the present embodiment, the composition ratio among the catalyst metals is changed by adjusting the additive amount of each metal salt at the time of preparing the mixed solution of a cobalt salt and a magnesium salt to immerse the platinum catalyst (Examples 1 to 3 and Comparative Examples 2 to 5). In addition, in the present embodiment, a conventional Pt—Co catalyst was manufactured (Comparative Example 1). In this Comparative Example 1, a solution prepared by dissolving only a cobalt salt is supported on the platinum catalyst as the above metal salt solution.

The catalyst according to each of Examples and Comparative Examples manufactured above was subjected to the evaluation on various physical properties. First, the catalyst manufactured was subjected to the composition analysis to measure the composition ratio among platinum, cobalt and magnesium in the catalyst particles. The composition analysis was conducted by ICP (inductively coupled plasma emission spectrometry). This analysis by ICP was conducted as follows. The catalyst was weighed by 20 mg, calcined and reduced, and then dissolved by adding about 5 ml of aqua regia to form into a solution, and a solution obtained by diluting this was subjected to the analysis. Here, it should be noted that the catalyst according to the present application contains a significantly small amount of magnesium and thus there is a case in which magnesium is not detected when the dilution rate of the above dilute solution is set to a general condition (about 20 times). In the present embodiment, the dilution rate is set to 5 times in consideration of this. The results of the composition analysis on the catalysts manufactured in the present embodiment are shown in Table 1.

TABLE 1

| | Composition ratio (molar ratio) |
|---|---|
| Example 1 | 1:0.473:0.00078 |
| Example 2 | 1:0.438:0.00077 |
| Example 3 | 1:0.420:0.00095 |
| Comparative Example 1 | 1:0.383:0.00012*[1] |
| Comparative Example 2 | 1:0.324:0.00171 |
| Comparative Example 3 | 1:0.301:0.00968 |
| Comparative Example 4 | 1:0.373:0.00335 |
| Comparative Example 5 | 1:0.475:0.00647 |

*A small amount of Mg was detected although Mg was not supported in Comparative Example 1.

Next, the catalysts according to Examples 1 to 3 and Comparative Examples 1 and 2 were subjected to the X-ray diffraction analysis and XPS (X-ray photoelectron spectroscopy) to investigate the composition of the catalyst particles. JDX-8030 manufactured by JEOL Ltd. was used as the X-ray diffraction apparatus. The samples were made into a fine powder form and introduced into a glass cell, and the analysis was conducted using a Cu (k$\alpha$ ray) as the X-ray source at a tube voltage of 40 kV, a tube current of 30 mA, $2\theta$=20 to 90°, a scanning speed of 7°/min and a step angle of 0.1°. XPS was conducted by applying an Al k$\alpha$ ray as the X-ray source at a voltage of 15 kV, a current of 1.66 mA and a beam diameter of 100 μm in a measurement range of 250 μm$^2$.

Figure 2:
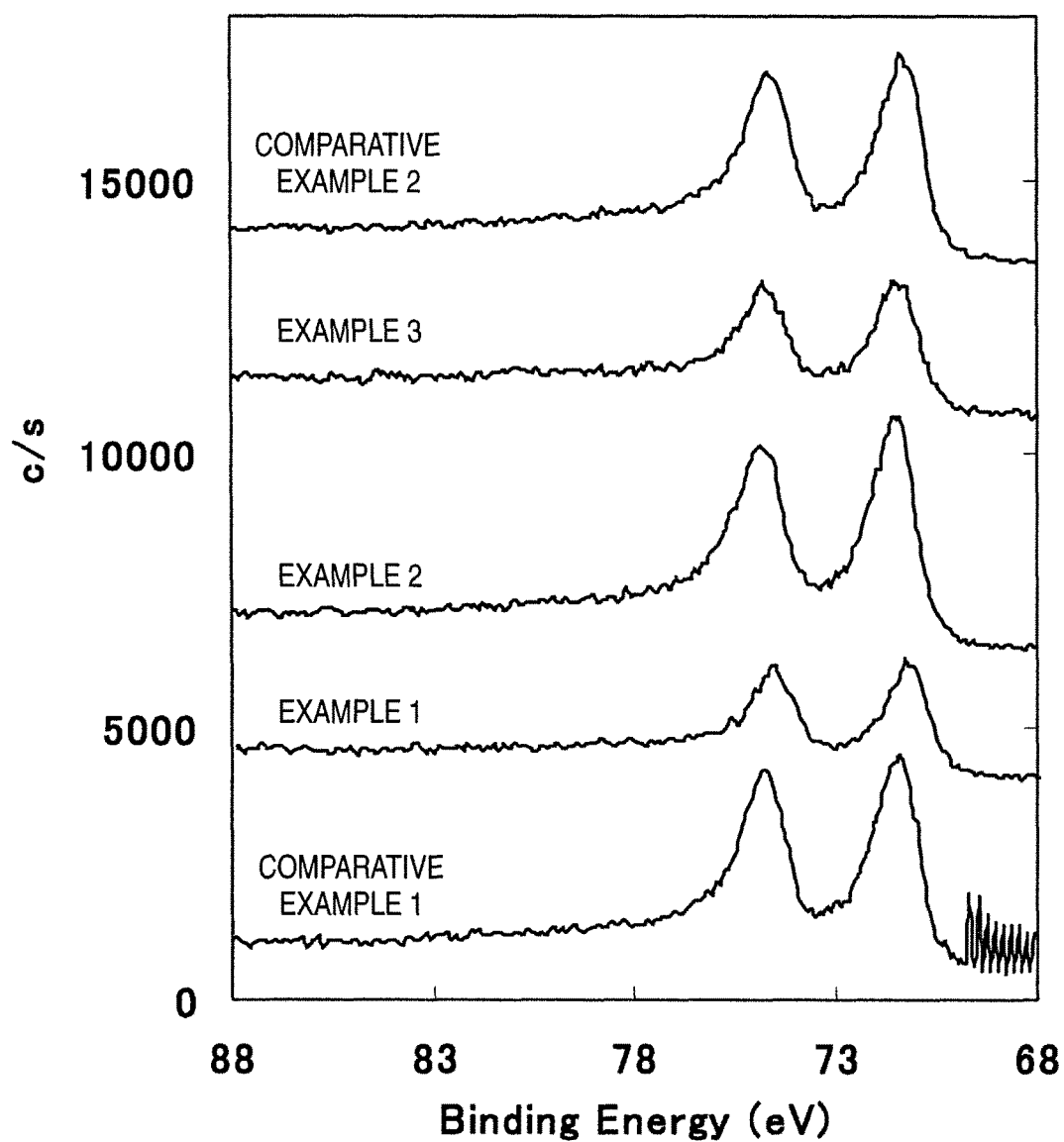
FIG. 2 illustrates the XPS spectrums of the respective catalysts according to Examples 1 to 3 and Comparative Examples 1 and 2.

FIG. 1 illustrates the X-ray diffraction patterns of the respective catalysts. In addition, FIG. 2 illustrates the XPS spectrums of the respective catalysts. Furthermore, the peak position of the main peak (in the vicinity of $2\theta$=40°) and the binding energy value (4f7/2) of platinum measured from the respective drawings are shown in Table 2.

TABLE 2

| | Composition ratio | Analysis result | |
|---|---|---|---|
| | (molar ratio) | Peak position | Binding energy |
| Example 1 | 1:0.473:0.00078 | 41.1° | 71.30 eV |
| Example 2 | 1:0.438:0.00077 | 41.2° | 71.38 eV |
| Example 3 | 1:0.420:0.00095 | 41.0° | 71.41 eV |
| Comparative Example 1 | 1:0.383:0.00012 | 40.7° | 71.37 eV |
| Comparative Example 2 | 1:0.324:0.00171 | 40.8° | 71.37 eV |

From these drawings and Tables, the following points can be confirmed. First, with regard to the X-ray diffraction pattern, the main peak appearing in the vicinity of $2\theta$=40° which is observed in all of the catalysts is a synthetic peak of metallic Pt and CoPt$_3$. In addition, in the diffraction pattern of each catalyst, a peak other than the peak of metallic Pt and CoPt$_3$ is not observed. The same applies to Examples 1 to 3 in which Mg is added. Hence, it is considered that the constituent phase of each catalyst is basically the same and a unique metal phase is not formed in Examples as well. However, the peak shift of the main peak to a higher angle side was observed in all of Examples 1 to 3.

On the other hand, with regard to the results of XPS, the binding energy of platinum is approximately equal in the respective catalysts and the peak shift in a predetermined direction is not observed among the respective Examples, and thus the bonding state of platinum is presumed to be the same in all of the catalysts. Hence, it is considered that the peak shift in the above X-ray diffraction pattern is not due to the formation of a new metal phase (new bond). The factor for that cannot be concluded, but it is considered to be caused by the manufacturing process and specific composition ratio of the catalyst.

Next, the conventional example of platinum alloy catalysts in each Example and Comparative Example was subjected to the initial performance test. This performance test was conducted by measuring the mass activity. A single cell was used in the experiment, and a membrane electrode assembly (MEA) in which a proton-conducting polymer electrolyte membrane was sandwiched between a cathode electrode and an anode electrode having an electrode area of 5 cm×5 cm=25 cm$^2$ was fabricated and evaluated. As a pre-treatment, a current/voltage curve was created under the conditions of hydrogen flow rate=1000 mL/min, oxygen flow rate=1000 mL/min, cell temperature=80° C., anode humidification temperature=90° C. and cathode humidification temperature=30° C. After that, the mass activity was measured as the main measurement. The test method was as follows. The current value (A) at 0.9 V was measured, the current value (A/g-Pt) per 1 g of Pt was determined from the weight of Pt coated on the electrode, and the mass activity was calculated. The results are shown in Table 3.

TABLE 3

| | Composition ratio (molar ratio) | Mass Activity*[2] (A/g-Pt at 0.9 V) |
|---|---|---|
| Example 1 | 1:0.473:0.00078 | 1.21 |
| Example 2 | 1:0.438:0.00077 | 1.15 |
| Example 3 | 1:0.420:0.00090 | 1.1 |
| Comparative Example 1 | 1:0.383:0.00012*[1] | 1.0 |
| Comparative Example 2 | 1:0.324:0.00171 | 0.9 |
| Comparative Example 3 | 1:0.301:0.00968 | 0.85 |
| Comparative Example 4 | 1:0.373:0.00335 | 0.58 |
| Comparative Example 5 | 1:0.475:0.00647 | 0.47 |

*[1]A small amount of Mg was detected although Mg was not supported in Comparative Example 1.
*[2]It is a relative comparison when taking Comparative Example 1 (Pt-Co catalyst) as 1.0.

From Table 3, all of the ternary catalysts of Pt—Co—Mg according to the respective Examples exert favorable initial activity when taking the Pt—Co catalyst as the reference. However, magnesium is not enough to be added and the initial activity is lower than that of the Pt—Co catalyst when the additive amount of magnesium is too much in the composition ratio. In addition, the activity decreases when the composition ratio of cobalt is out of the suitable range.

INDUSTRIAL APPLICABILITY

According to the invention, it is possible to achieve an improvement of the initial power generation properties as an electrode catalyst for solid polymer fuel cell. The invention contributes to the spread of a fuel cell and is consequently to be a foundation of the environmental problem solution.

The invention claimed is:

1. A catalyst for solid polymer fuel cell having catalyst particles comprising platinum, cobalt and magnesium supported on a carbon powder carrier, wherein a composition ratio (molar ratio) among platinum, cobalt and magnesium in the catalyst particles is Pt:Co:Mg=1:0.4 to 0.5:0.00070 to 0.00095, the catalyst particles having an X-ray diffraction pattern comprising a highest peak around $2\theta=41.0°-41.5°$.

2. The catalyst for solid polymer fuel cell according to claim 1, wherein a supporting density, which is a mass of the catalyst particles supported on the carbon powder carrier with respect to an entire mass of the catalyst, is from 30 to 70%.

* * * * *